United States Patent
Rugge

(10) Patent No.: US 6,812,926 B1
(45) Date of Patent: Nov. 2, 2004

(54) DISPLAYING DATA CONTAINING OUTLYING DATA ITEMS

(75) Inventor: Robert D. Rugge, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 269 days.

(21) Appl. No.: 10/082,236

(22) Filed: Feb. 26, 2002

(51) Int. Cl.[7] .............................................. G06T 11/20
(52) U.S. Cl. ..................... 345/440; 345/440.2; 715/500; 715/502; 283/115
(58) Field of Search ........................ 345/440.2; 715/502

(56) References Cited

U.S. PATENT DOCUMENTS

| | | | |
|---|---|---|---|
| 4,451,825 A | | 5/1984 | Hall et al. |
| 4,608,557 A | * | 8/1986 | Nakanishi et al. ........ 345/440.2 |
| 5,535,324 A | | 7/1996 | Alvarez et al. |
| 5,917,499 A | | 6/1999 | Jancke et al. |
| 6,185,512 B1 | * | 2/2001 | Lambrecht .................... 702/97 |
| 6,429,868 B1 | * | 8/2002 | Dehner et al. ............... 345/440 |

OTHER PUBLICATIONS

Woodruff et al. "Constant Density Visualizations of Non–Uniform Distributions of Data." SIGCHI, 11th annual ACM symposium. ACM Press. 1998, pp. 19–28.*
Miller et al. "Data Management for Volunteer Monitors." Massachusetts Water Watch Partnership (MassWWP) Online. 1999 version. http://www.umass.edu/tei/mwwp/acrobat/mgtmnl.pdf. p. 14.*
Joseph Schorr, MacUser, v11, n3, p98(8), "Top of the Charts (seven charting and presentation graphics packages reviewed)"; Mar. 1995.
G. Cuellar, PC Magazine, v4, n13, p213–214, A Bar Chart for All Reasons ; Jun. 25, 1985.
Wayne Kawamoto, Computer Shopper, v14, n7, p508(9), "Presentation is everything: Six presentation products reviewed"; Jul. 1994.
Scott Ambler, Computer Canada, v19, n26, –21(1), Graphing program ideal for DSS developers; Dec. 1993.
William Harrel, Home Office Computing, v11, n12, p38(2), "Pictures tell the story"; Dec. 1993.
PC Sources, v3, n4, p489(1), "Every picture tells a story: charting capabilities"; Apr. 1992.
Kelly R. Conatser, Lotus, v8, n1, p50(5), "From numbers to graphs"; Jan. 1992.
Thom Hogan, MacUser, v7, n12, p237(2), "Graphic details"; Dec. 1991.
Mitt Jones, PC Magazine, v10, n5, –145(32), "12 technical graphics packages"; Mar. 26, 1991.
Robbin Juris, PC Magazine, V7, N5, –124(3), "Lotus Graphwriter II"; Mar. 15, 1988.
M. David Stone, PC Magazine, v7, n5, –97(3), "Boeing Graph"; Mar. 15, 1988.
Jill Seymour, PC Magazine, v7, n5, p93(24), "Business graphics software: at the top of the charts"; Mar. 15, 1988.

(List continued on next page.)

Primary Examiner—Matthew C. Bella
Assistant Examiner—Antonio Caschera
(74) Attorney, Agent, or Firm—Banner & Witcoff, Ltd.

(57) ABSTRACT

Multiple data items having at least one outlying data item are displayed so as to avoid obscuring the display of non-outlying data items. In this manner, a graphical representation of multiple data items such as, e.g., a bar graph is made more useful. A threshold value is used for determining whether each data item is an outlier. Each data item that is an outlier is graphically represented in modified form to indicate that it is not displayed at the same scale as non-outlying data items. Multiple outlying data items can be represented as images scaled with regard to other outlying data items.

42 Claims, 6 Drawing Sheets

OTHER PUBLICATIONS

Joel N. Orr, Computer–Graphics World, v13, n7, –79(3), "The value of pictoracy—how can we better produce and understand the pictures we create?"; Jul. 1990.

Garry Ray, PC Week, v4, n25, p89(2), "Program converts 1-2-3 graphs to 3-D form"; Jun. 23, 1987.

Susan Janus, PC Week, v4, n29, –118(1), "Graphics become indispensable part of spreadsheet packages"; Jul. 21, 1987.

Glenn Hart, PC Magazine, v6, n5, p273(9), "Specialized graphics software: the quick and clean solution"; Mar. 10, 1987.

Jan Snyders, Infosystems, v33, n4, p60–61, "Illustrate and educate with graphics software"; Apr. 1986.

P. Gillin, PC Week, v2, n39, p10, "Javelin Previews Financial Modeling Package"; Oct. 1, 1985.

Michael Minor, PC Week, v4, n35, p140(4), "Users of statistical programs wonder: At what price will they get graphics?"; Sep. 1, 1987.

Barbara Elizabeth Martinson, Ph.D., "Information representation; A comparison of data structures represented in pictorial and non–pictorial formats"; University of Minn. 1991.

\* cited by examiner

DISPLAYING DATA CONTAINING OUTLYING DATA ITEMS

FIELD OF THE INVENTION

This invention relates to systems and methods for graphically representing multiple data items where the magnitude of one or more data items is substantially larger than the magnitude of other data items.

BACKGROUND OF THE INVENTION

Humans generally tend to comprehend and assimilate information more quickly when that information is graphically presented. This is particularly true with regard to numerical values. When a series of numerical values must be considered, it is often advantageous to present those values in graphical form instead of as raw numbers or as a table of numbers. A common way of graphically depicting several data items is a bar graph. Each data item is represented as a separate bar, with the length of the bars sized in the same relative proportion as the corresponding data items. In order to maximize the space available for displaying the graph, it is known to scale the graph size based on the data item having the largest magnitude. This is best illustrated by example. Assume a person wished to prepare a chart showing the following monthly expenses for a particular year: January, $125; February, $38; March $75; and April, $52. Further assume that the graph must be placed in a space where the largest bar can be 1.25 inches long. Dividing the largest value ($125) by the available space for that bar (1.25 inches) gives a vertical scale for the graph of $100 per inch (or $25 per ¼ inch). The largest bar (January, $125) is 1.25 inches high, and the smallest bar (February, $38) is 0.38 (⅜) inches high. FIG. 1, drawn approximately to scale, illustrates this.

There are limitations to the usefulness of bar charts, however. If one of the data items in a data set has a magnitude that is out of proportion relative to the other data items in the set (i.e., the data item is an "outlier"), displaying the data set in a scaled graph or chart becomes awkward. For example, if January expenses from the prior example were $1,250, the largest bar would still occupy 1.25 inches, but the remaining bars would only be 0.038, 0.075 and 0.052 inches high. FIG. 2, also drawn approximately to scale, illustrates the impact of the increase in January expenses. The smaller bars become almost imperceptible, and the chart is thus less useful. Such a chart could also tend to obscure any trends in the data items, particularly if the January data item is aberrational. In other words, one abnormal data point could make the chart virtually useless with respect to the other data points. These problems can be more acute in a computer context. Many display devices have a size and/or resolution that is significantly less precise than might by found in a newspaper or other printed media. Because the display is typically limited to a discrete number of pixels, very small differences between data item sizes may be even less perceptible.

Previous methods of displaying data sets with outlying data items have included use of logarithmic or other non-linear scales. However, such scales can be misleading if the observer is not aware of the logarithmic scaling. Because logarithmic scales are not as commonly used in certain non-technical areas as they may be in more scientific disciplines, a logarithmic scale could easily be overlooked. Even if the observer is aware of the logarithmic scale, however, such scales may not be as intuitive as a linear scale, and thus require more study to fully comprehend.

SUMMARY OF THE INVENTION

The present invention allows visual representation of a set of data items containing outlying data such that images representing non-outlying data items are not reduced to the point of obscurity. Graphical representations of outlying data items are truncated or otherwise modified, and the remaining non-outlying data may be represented in a linear, easy to read fashion. In one embodiment of the invention, a threshold value of all the data items is determined, and each data item is compared against that threshold to determine if it is an outlier. The threshold may be a mean or a median of the data items, a multiple of the mean or median of the data items, or any other appropriate value. Data items having a magnitude exceeding the threshold are represented as images having a "break" or other indication that the image is not scaled relative to other data items. The remaining data items may then be displayed in a graph that is scaled based on the largest data item magnitude that does not exceed the threshold. In this manner, a more effective and usable graphic presentation of the data is possible.

The invention may be implemented with regard to horizontally and vertically oriented graphs, with regard to 2-D and 3-D graphs, and with regard to other types of graphical data representations. Multiple outliers can be represented in a single graph as identically-sized images, or as scaled images. In one embodiment of the invention, an outlier is represented as an image having a maximum image size, with the largest non-outlier represented as an image having a size equal to a percentage of the maximum. The invention can be implemented in a general purpose digital computer or in any other device which can be configured to generate a graphical display of data items.

DETAILED DESCRIPTION OF THE INVENTION

The present invention provides an automatic system and method for graphically displaying a set of data items where one or more of those data items is an "outlier." As used in this specification, "outlier" refers to a data item whose magnitude, by comparison to other data items in a set of data items, is disproportionately large. As used in this specification, "magnitude" refers to a quantification of a data item's size in relation to other data items, and can include: values of positive numbers; absolute values of negative numbers; or the sum of a positive component and the absolute value of a negative component. For convenience, "non-outlier" will be used to refer to a data item whose magnitude relative to other data items in a set is not disproportionately large. What constitutes "disproportionately large" can vary by circumstances, and can be influenced by factors such as size of graph, number of data items, purpose for which graph will be used, required resolution, etc. The invention therefore contemplates adjustment of the outlier threshold to accommodate differing requirements. Moreover, a set of data items containing an outlier may be graphically displayed in multiple ways. For convenience and clarity of explanation, the invention will be described using a vertically-oriented 2-dimensional bar graph as an example. However, persons skilled in the art will appreciate that the invention can be applied to, and therefore includes, other manners of graphically representing a set of data items. Examples include, but are not limited to, horizontally-oriented graphs, 3-dimensional graphs, line charts and "radio" graphs.

The invention can be implemented in numerous computing environments, and is generally applicable to any type of device that is configured or configurable to make calculations and generate a graphical display of data items. Examples include, but are not limited to, "mainframe" computers, personal computers, laptop computers, portable computing devices and application-specific hardware (e.g., an Application Specific Integrated Circuit (ASIC)). Similarly, the invention can be implemented as a separate application program, as part of other software, as firmware, as an applet downloable over the Internet, and in numerous other ways. Indeed, the invention could be implemented as software giving the user the option of whether or not to display outliers differently than non-outliers.

Figure 1:
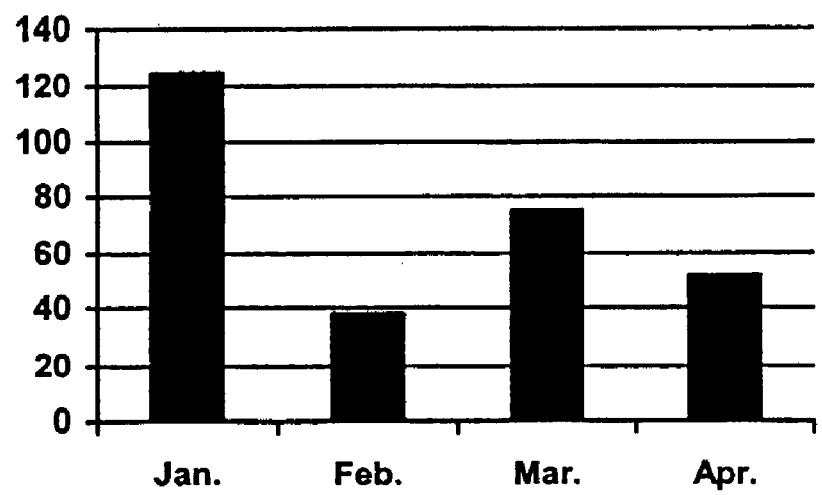
FIG. 1 is a conventional bar graph with no disproportionate data items.
Figure 2:
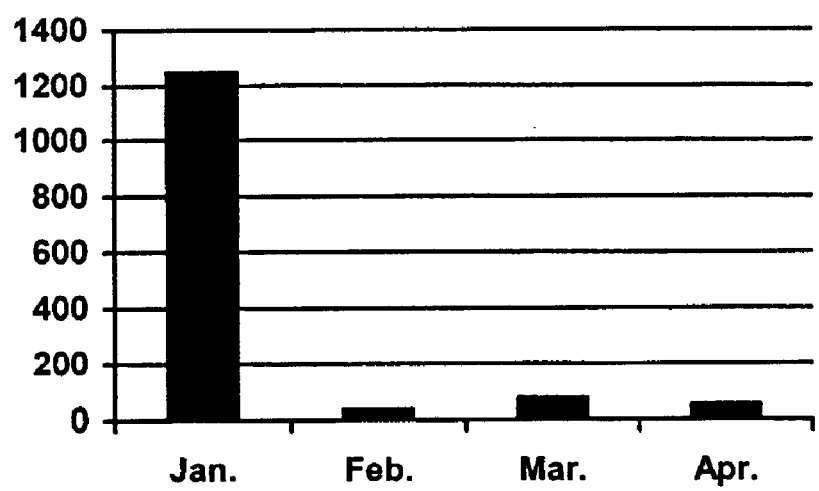
FIG. 2 is a conventional bar graph with a disproportionate data item.
Figure 3:
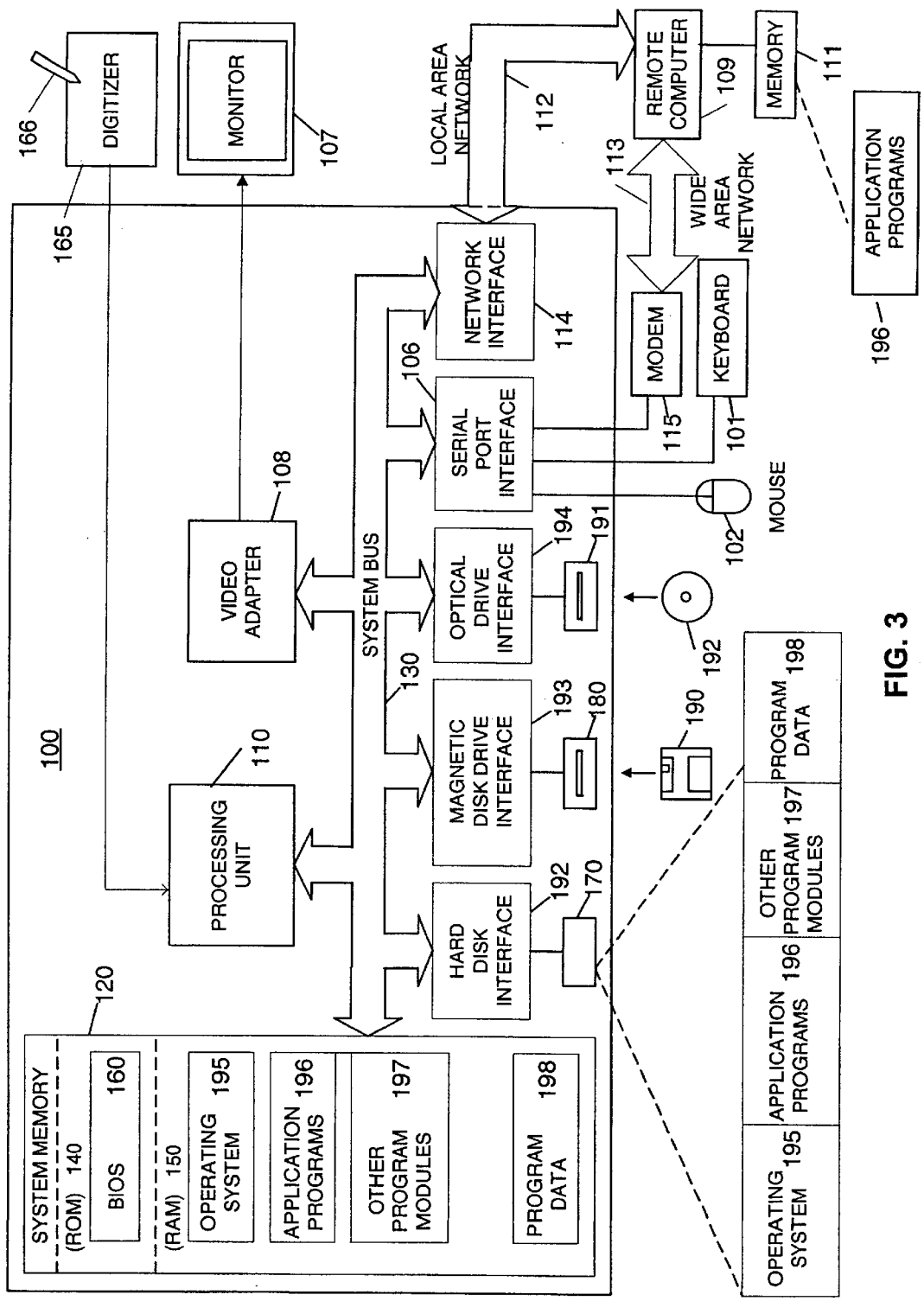
FIG. 3 is a block diagram of a conventional general purpose digital computing environment.

One exemplary computer environment in which the invention can be implemented is shown in FIG. 3. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any variety of bus architectures. The system memory 120 can include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 can also include a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable and computer executable instructions, data structures, program modules and other data for the computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, computers typically include other peripheral devices such as speakers (not shown), as well as printers or other devices for graphically presenting output (also not shown). A pen digitizer 165 and accompanying pen or stylus 166 may also be provided in order to digitally capture freehand input. Although a direct connection between the pen digitizer 165 and the processing unit 110 is shown, the pen digitizer 165 may be coupled to the processing unit 110 via a serial port, parallel port or other interface and the system bus 130 as known in the art. Furthermore, although the digitizer 165 is shown apart from the monitor 107, the usable input area of the digitizer 165 could be co-extensive with the display area of the monitor 107. Further still, the digitizer 165 may be integrated in the monitor 107, or may exist as a separate device overlaying or otherwise appended to the monitor 107.

Computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 3. The logical connections depicted in FIG. 3 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. The network connections shown are exemplary and other techniques for establishing a communications link between computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 4:
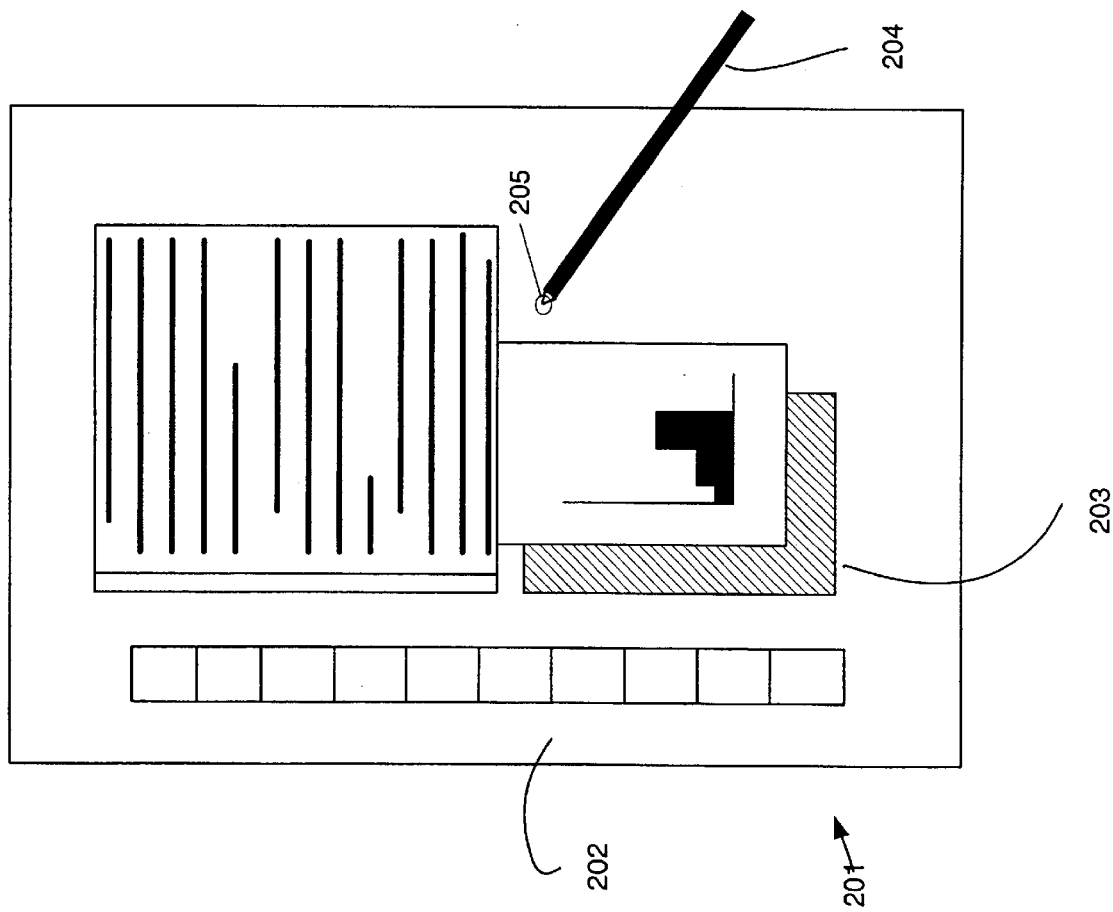
FIG. 4 is a stylized drawing of a hand-held computing device.

FIG. 4 illustrates an exemplary hand-held computing device 201 on which the invention could also be implemented. Any or all of the features, subsystems, and functions in the system of FIG. 3 could be included in the device of FIG. 4. Device 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers. Other types of pen digitizers, e.g., optical digitizers, may also be used. Device 201 interprets gestures made using stylus 204 in order to manipulate data, enter text, create drawings, and/or execute conventional computer application tasks such as spreadsheets, word processing programs, and the like. The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

Figure 5:
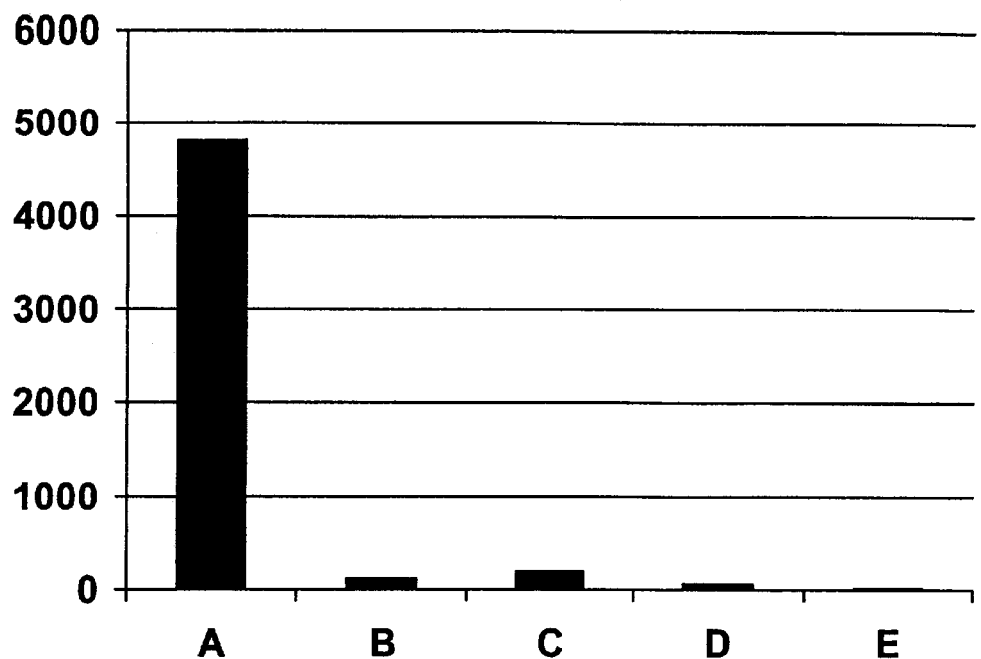
FIG. 5 is a conventional bar graph having one outlying data item.

FIG. 5 shows a conventional 2-D bar chart for a set of data items A–E, having respective values of 4800, 110, 200, 50 and 20. Each data item can represent any quantity or other thing of interest, and the numbers chosen are for purposes of illustration only. The data items could represent expenses, income, physical quantities, or any other thing that can be assigned a value. As but one example, A–E could represent cash disbursements by an individual in a monthly period. That person might typically have expenses on the order of $100 to $200, but may have an abnormally high expense in one month (e.g., a major purchase, a large home repair bill, a major medical expense, etc.). As is clear from FIG. 5, the large magnitude of item A relative to items B–E renders the values of B–E difficult or impossible to determine. Although items B–E are still identifiable, the compressed scale of the graph (resulting from basing graph size on the largest data item A) limits the precision by which their values may be determined. It is also difficult or impossible to assess any relationships among the non-outliers B–E. It is difficult, for example, to see that the magnitude of D is over twice that of E, or that B is more than twice the value of D. It is also difficult to visually recognize trends with graphs such as FIG. 5. Continuing the example above, where A is a one-time or highly infrequent expense, it is difficult to see that the largest recurring expenses are B and C. The person with expenses A–E might thus have difficulty deciding which expense items to address to most effectively make budgetary decisions. In sum, the presence of an outlier renders the graph useless or ineffective for many of the purposes for which a graph could be used.

Figure 6:
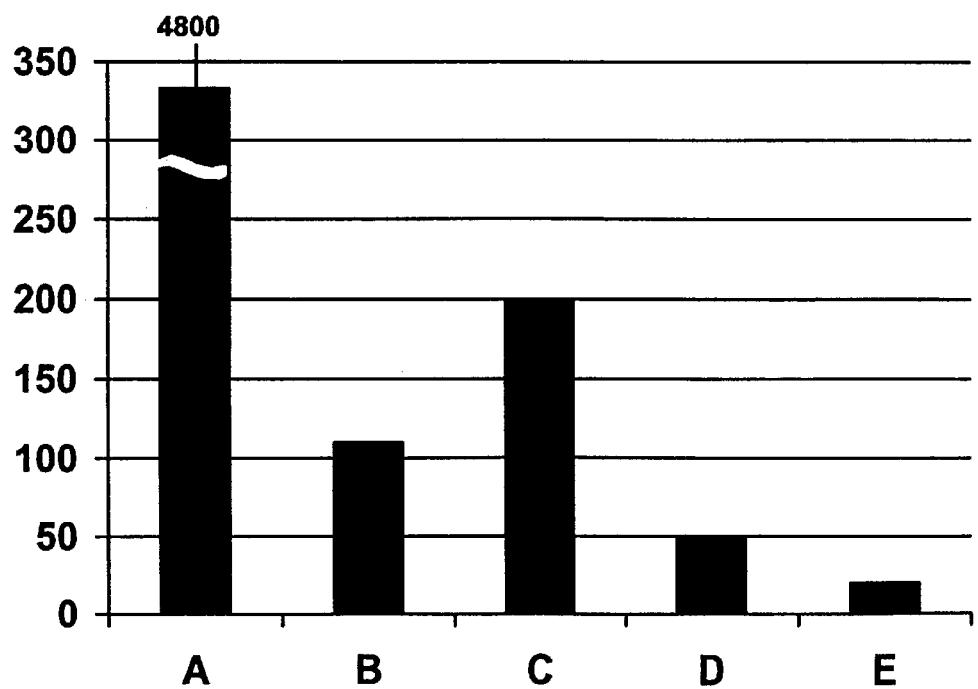
FIG. 6 is the bar graph of FIG. 5 redrawn according to one embodiment of the invention.

FIG. 6 shows the 2-D bar graph of FIG. 5 modified in accordance with one embodiment of the invention. Data items A–E in FIG. 6 have the same values as A–E of FIG. 5. The graph size of FIG. 6, like that of FIG. 5 is based on the magnitude of the largest data item A. However, instead of representing item A as a continuous bar, the bar is broken as an indication that item A is an outlier, i.e., that A is significantly greater in magnitude than items B–E. Although a curved "break" in the bar is used as the indicator in this example, numerous alternatives could be used (e.g., a different type of break, different shading or color, a textual callout or other legend, etc.), and are within the scope of the invention. Indeed, any type of textual or visual indicator that conveys a discontinuity through known or defined convention may be used. As used in this description, the term "break" includes all such indicators. The break in the bar representing A indicates that the magnitude cannot be determined from the vertical scale at the left of the graph, but is instead provided by a "call-out" legend at the top of the bar. Because the graph's scale is no longer used to quantify the value of item A, a larger scale can be used that is more appropriate to the smaller items B–E. The precision with which the values of items B–E can be determined is thus higher.

Figure 7:
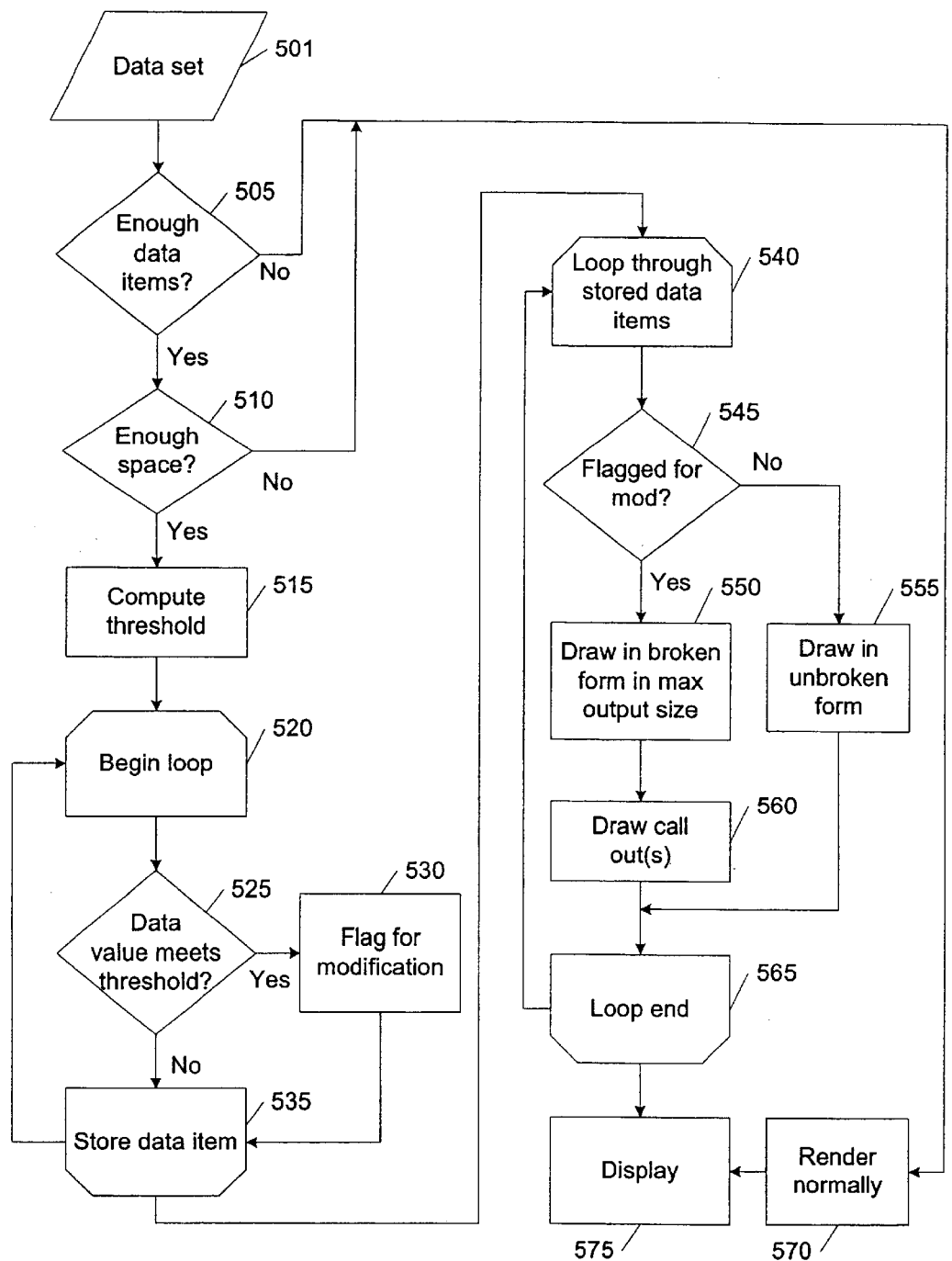
FIG. 7 is a flow chart showing operation of one embodiment of the invention.

One method of implementing the invention is shown in FIG. 7, and is described using the data set of FIG. 6 as an example. As set forth below and as will be clear to persons skilled in the art in light of this description, numerous variations and modifications are possible and are within the scope of this invention.

Data items A–E are presented for graphing at step 501. At step 505, a determination is made regarding whether the number of data items is large enough to warrant breaking one or more of the larger items. If, for example, there were only one or two items, there may be little need for observing a trend or precisely quantifying the smaller data item(s). In the exemplary method shown in FIG. 7, no breaking occurs if the number of data items is two or less. If the number of data items is 2 or less, execution proceeds to step 570, and all data items are rendered normally (i.e., without a break or other indication for outliers). The minimum number of data items to allow breaking can be set at any desired level (indeed, a minimum is not required).

At step 505, it is determined that the number of data items (5, in the example) meets the minimum level to allow breaking. At step 510, the size available for the largest bar in the graph (Hmax) is compared to the space required to display a break (or other indication of an outlier). For example, if displaying a break requires 20 pixels, but there are only 40 pixels of height available for the graph, there may be no benefit to including a break. In such a circumstance, the break would consume much of the available space, be visually distracting, and render the graph less useful than a normal graph. In the example, it is determined at step 510 whether the space available for the graph is at least 400% of the size of the break or other outlier indicator. In other words, a break can be used if $$H\text{break} < \left(\frac{H\text{max}}{4}\right),$$

where Hbreak equals the size of the break or other outlier indication. Because a graph could be horizontally oriented, or otherwise not vertical, Hmax could represent the available height, the available width, or other relevant dimension. Moreover, other criteria can be used to determine whether or not to make breaks or other indicators available. In some media, for example, it may be less critical for the non-broken part of a bar to have a minimum size. Other circumstances may similarly require less (or no) minimum space before permitting a break, while others may require a greater amount of minimum space. Some types of outlier indicia (e.g., a different shading or color) may require no minimum space. Accordingly, the amount of space required before allowing a break is not a required part of the invention.

If the minimum space requirement is not satisfied, the exemplary method of FIG. 7 proceeds to step 570, and the graph is rendered normally. If the minimum space is available, execution proceeds at step 515 to calculate the threshold for determining whether a data item is an outlier. In the example, the median of the values of all data items in the set is first calculated. The outlier threshold is then calculated as 200% of the median. The threshold for outlier values could be calculated in many ways, however, and the invention is not limited to this particular formulation. As but one example, the arithmatic mean could be used instead of the median. Similarly, the threshold could be greater or less than the median, mean or other chosen value. The threshold could vary based on output medium. For example, some output spaces may have a high definition that makes viewing smaller bars easier, and thus allow a higher break threshold. After the breaking threshold is calculated and stored at step 515, it is determined (beginning at step 520) whether each data item is an outlier (and will thus be represented as a broken bar) or a non-outlier (and will be represented as a normal bar). At step 525, a data item is compared to the breaking threshold, and if greater than the threshold, is flagged for breaking at step 530. Depending upon how the threshold is calculated, the comparison could comprise some other mathematical operator, and the invention is thus not limited to the greater than ">") operator. At step 535, the data item is stored, and execution loops back to step 520. If a data item does not meet the threshold at step 525, step 530 is bypassed, and the data item is stored without a break flag. The process then returns to step 520. The loop is repeated for all data items in the set.

After all data items in the data set are evaluated for breaking eligibility in the loop of 520–535, the stored items are drawn starting at step 540. At step 545, a data item is checked for flagging. If the item was flagged for breaking, a broken bar is generated for the data item at step 550. In the exemplary method illustrated in FIG. 7, and so as to maximize use of the space available for the graph, the broken bar for the data item is drawn at a height equal to the maximum height available (Hmax). In other embodiments, a broken bar could be sized in another manner. At step 560, a "call out" or other legend is created for the bar. Execution proceeds to step 565, and then loops back to step 540 for the next data item. If at step 545 a data item is not flagged for modification, the process draws an "unbroken" bar for the data item at step 555. In the exemplary embodiment, the broken bar will be the largest in the graph (in order to emphasize its magnitude relative to other data items), and unbroken bars are scaled against a percentage of the maximum height. In the example, the unbroken bars are drawn with their sizes having the same relative proportions as their magnitudes, and scaled at 60% of the maximum height. In other words, the height H of an unbroken bar for a non-outlying data item i is:

$$H = \left(\frac{Xi}{X\max}\right) * 60\% * H\max,$$

where Xi is the magnitude of the non-outlier data item, Xmax is the magnitude of the largest non-outlier data item, and Hmax is the maximum height available for a bar. As was the case with previous steps, the precise formulation by which the non-outliers are scaled is not critical to the invention, and other formulations could be used. With the above formula, the 60% value could be 75%, 80%, or any other appropriate value (including less than 60%). Moreover, the formulation could vary by output medium. If there is less visual representation (e.g., only 100 pixels of space), it might be desired to have all bars sized larger, and a higher percentage could be used in the formula. If there is more display space available, using a smaller percentage might be desired. After all data items have been processed in the second loop 540–565, execution proceeds to step 575, where bars representing all data items in the set are displayed.

Numerous alternative algorithms and/or modifications to the algorithm described by FIG. 7 are within the scope of the invention. As but one example, the "flagging" loop 520–535 could be omitted, and step 525 ("Data value meets threshold?") substituted for step 545 ("Flagged for mod?"). Numerous other variations and alternatives are possible.

As shown in FIG. 6, the legend for the vertical scale can be based upon the unbroken bars, allowing the magnitude of the unbroken bars to be visually determined by reference thereto.

Figure 8:
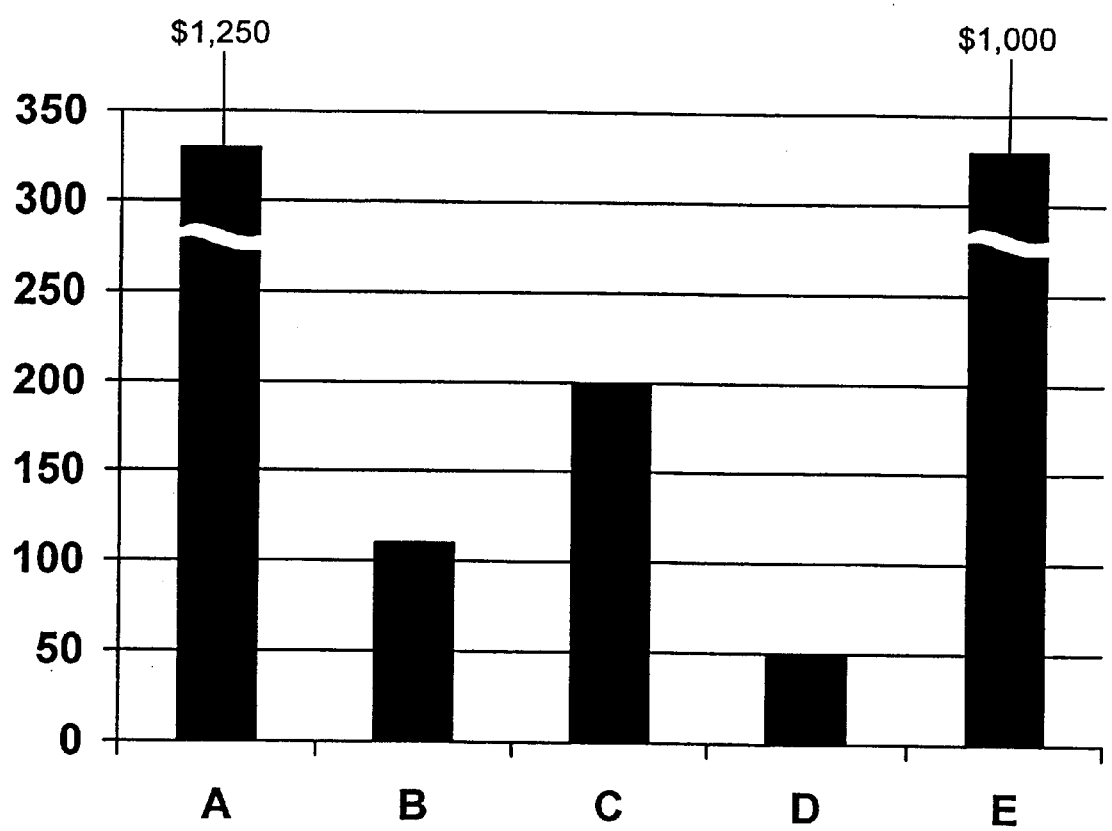
FIG. 8 is a bar graph, according to one embodiment of the invention, having two outlying data items.

Persons skilled in the art will appreciate that numerous variations on the above-described process are possible and within the scope of the invention. The invention could also be implemented in connection with horizontally oriented graphs, 3-D, graphs, and other manners of graphically representing multiple data items with proportionately-sized areas or volumes. Although the prior example only contained a single outlier, the invention is also applicable to data sets with multiple outliers. FIG. 8 shows a graph with multiple outliers A and E. In this example, all outliers in the data set are represented as broken bars of the same height, with the difference in values denoted only by a call-out or other legend. Multiple outliers could also be represented as broken bars of different heights so as to visually depict a difference in magnitude of multiple outliers. In the latter case, the height of each outlier could be determined in step 550 according to a calculation such as the following:

$$Ho = H\min + \left(\frac{Xo - Xo\min}{Xo\max - Xo\min}\right) * (H\max - H\min),$$

where Ho is the height of a broken bar for an outlier, Xomax is the magnitude of the largest outlier, Xo is the magnitude of the outlier under consideration, Xomin is the magnitude of the smallest outlier, and Hmin is the smallest height allowed for a broken bar. This formula will scale all outliers as proportionately sized broken bars with the smallest having a height Hmin and the largest having a height Hmax. Other formulas could be used. For example, each broken bar could be 5% larger than the previous bar for a data item of lesser magnitude. Other possible variations include treating as outliers data items that are disproportionately smaller than other data items in a set, and displaying those types of outliers with a special indication. Other variations include not altering the bar or other graph component, but simply inserting text indicating that the bar (or other component) is not to scale (or that its value is something other than what the graph's scale suggests). These and other modifications are within the scope of the invention, which is only limited by the attached claims.

What is claimed is:

1. An automated method of graphically representing a plurality of data items, wherein each data item has a numerically quantifiable magnitude and at least one data item is an outlier, comprising:

automatically determining an outlier threshold value, such that representation of both over-threshold magnitudes and under-threshold magnitudes using a single linear scale would reduce visual differences between under-threshold magnitudes below a predetermined level;

comparing the magnitude of each data item with the threshold value to determine if each of the data items is an outlier;

representing non-outlier data items as images sized to a common linear scale;

representing each outlier data item as a modified image not sized to the common linear scale; and determining whether there are at least three data items; wherein the comparing and the representing each outlier data item steps are only performed if there are at least three data items; and wherein, if there are less than three data items, all data items are represented as images sized to the common linear scale.

2. The method of claim 1, further comprising flagging each data item determined to be an outlier.

3. The method of claim 1, wherein the threshold value comprises a multiple of the median of the magnitudes of the data items.

4. The method of claim 1, wherein the threshold value comprises the sum of the median of the magnitudes of the data items and a second number.

5. The method of claim 1, wherein the threshold value comprises a multiple of the mean of the magnitudes of the data items.

6. The method of claim 1, wherein the threshold value comprises the sum of the mean of the magnitudes of the data items and a second number.

7. The method of claim 1, wherein a modified image has a size equal to a maximum image size.

8. The method of claim 1, wherein an outlier data item is represented as a modified image having a size equal to a maximum image size, and wherein the non-outlier data item having the largest magnitude is represented as an image having a size equal to a designated percentage of the maximum image size.

9. The method of claim 1, further comprising the step of associating a call-out legend with a modified image to indicate the magnitude of the corresponding outlier data item.

10. The method of claim 1, further comprising the step of associating a call-out legend with a modified image to indicate the magnitude of the corresponding outlier data item, and not associating call-out legends with images corresponding to non-outlier data items.

11. The method of claim 1, wherein each image comprises a bar in a bar graph, and wherein each modified image comprises a bar with a break therein.

12. An automated method of graphically representing a plurality of data items, wherein each data item has a numerically quantifiable magnitude and at least one data item is an outlier, comprising:

determining a threshold value for the data items;

comparing the magnitude of each data item with the threshold value to determine if each of the data items is an outlier;

representing non-outlier data items as images having relative sizes with proportions having substantially the same relative ratios as the magnitudes of the non-outlier data items;

determining whether the size of an image modification bears a predetermined relation to a maximum image size;

representing each outlier data item as a modified image if the size of the image modification for the outlier data item bears the predetermined relation to the maximum image size; and representing each outlier data item as though it was a non-outlier data item if the size of the image modification for the outlier data item does not bear the predetermined relation to the maximum image size.

13. The method of claim 12, wherein the predetermined relation comprises the state of being less than a designated percentage of the maximum image size.

14. An automated method of graphically representing a plurality of data items, wherein each data item has a numerically quantifiable magnitude and at least one data item is an outlier, comprising:

determining a threshold value for the data items;

comparing the magnitude of each data item with the threshold value to determine if each of the data items is an outlier;

representing non-outlier data items as images having relative sizes with proportions having substantially the same relative ratios as the magnitudes of the non-outlier data items; and representing each outlier data item as a modified image, wherein each outlier data item is represented as a modified image with a size adjusted in relation to the magnitudes of other outlier data items, and wherein outlier data items having different values are represented as modified images of differing sizes.

15. A computer-readable medium having computer-executable instructions for performing steps comprising:

storing a plurality of data items, wherein each data item has a numerically quantifiable magnitude and at least one data item is an outlier;

determining a threshold value for the data items;

comparing the magnitude of each data item with the threshold value to determine if each of the data items is an outlier;

representing non-outlier data items as images having relative sizes with proportions having substantially the same relative ratios as the magnitudes of the non-outlier data items determining whether the size of an image modification bears a predetermined relation to a maximum image size;

representing each outlier data item as a modified image if the size of the image modification for the outlier data item bears the predetermined relation to the maximum image size; and representing each outlier data item as though it was a non-outlier data item if the size of the image modification for the outlier data item does not bear the predetermined relation to the maximum image size.

16. The computer-readable medium of claim 15, wherein the predetermined relation comprises the state of being less than a designated percentage of the maximum image size.

17. A computer-readable medium having computer-executable instructions for performing steps comprising:

storing a plurality of data items, wherein each data item has a numerically quantifiable magnitude and at least one data item is an outlier:

automatically determining an outlier threshold value, such that representation of both over-threshold magnitudes and under-threshold magnitudes using a single linear scale would reduce visual differences between under-threshold magnitudes below a predetermined level;

comparing the magnitude of each data item with the threshold value to determine if each of the data items is an outlier;

representing non-outlier data items as images sized to a common linear scale;

representing each outlier data item as a modified image not sized to the common linear scale; and determining whether there are at least three data items; wherein the comparing and the representing each outlier data item steps are only performed if there are at least three data items; and wherein, if there are less than three data items, all data items are represented as images sized to the common linear scale.

18. The computer-readable medium of claim 17, having further computer-executable instructions for performing the step of flagging each data item determined to be an outlier.

19. The computer-readable medium of claim 17, wherein the threshold value comprises a multiple of the median of the magnitudes of the data items.

20. The computer-readable medium of claim 17, wherein the threshold value comprises the sum of the median of the magnitudes of the data items and a second number.

21. The computer-readable medium of claim 17, wherein the threshold value comprises a multiple of the mean of the magnitudes of the data items.

22. The computer-readable medium of claim 17, wherein the threshold value comprises the sum of the mean of the magnitudes of the data items and a second number.

23. The computer-readable medium of claim 17, wherein a modified image has a size equal to a maximum image size.

24. The computer-readable medium of claim 17, wherein an outlier data item is represented as a modified image having a size equal to a maximum image size, and wherein the non-outlier data item having the largest magnitude is represented as an image having a size equal to a designated percentage of the maximum image size.

25. The computer-readable medium of claim 17, having further computer-executable instructions for performing the step of associating a call-out legend with a modified image to indicate the magnitude of the corresponding outlier data item.

26. The computer-readable medium of claim 17, having further computer-executable instructions for performing the step of associating a call-out legend with a modified image to indicate the magnitude of the corresponding outlier data item, and not associating call-out legends with images corresponding to non-outlier data items.

27. The computer-readable medium of claim 17, wherein each image comprises a bar in a bar graph, and wherein each modified image comprises a bar with a break therein.

28. The system of claim 27, wherein the process is further configured to flag each data item determined to be an outlier.

29. A computer-readable medium having computer-executable instructions for performing steps comprising:

storing a plurality of data items, wherein each data item has a numerically quantifiable magnitude and at least one data item is an outlier;

determining a threshold value for the data items;

comparing the magnitude of each data item with the threshold value to determine if each of the data items is an outlier;

representing non-outlier data items as images having relative sizes with proportions having substantially the same relative ratios as the magnitudes of the non-outlier data items; and representing each outlier data item as a modified image, wherein each outlier data item is represented as a modified image with a size adjusted in relation to the magnitudes of other outlier data items, and wherein outlier data items having different values are represented as modified images of differing sizes.

30. A system for graphically representing a plurality of data items, wherein each data item has a numerically quantifiable magnitude and at least one data item is an outlier, comprising:

a display;

a memory; and a processor configured to:
access the data items stored in the memory.
automatically determine an outlier threshold value, such that representation of both over-threshold magnitudes and under-threshold magnitudes using a single linear scale would reduce visual differences between under-threshold magnitudes below a predetermined level,
compare the magnitude of each data item with the threshold value to determine if each of the data items is an outlier,
represent non-outlier data items on the display as images sized to a common linear scale,
represent each outlier data item on the display as a modified image not sized to the common linear scale,
determine whether there are at least three data items,
compare the magnitude of each data item to the threshold value only if there are at least three data items,
represent each outlier data item as a modified image only if there are at least three data items, and
represent all of the data items as images sized to the common linear scale if there are less than three data items.

31. The system of claim 30, wherein the threshold value comprises a multiple of the median of the magnitudes of the data items.

32. The system of claim 30, wherein the threshold value comprises the sum of the median of the magnitudes of the data items and a second number.

33. The system of claim 30, wherein the threshold value comprises a multiple of the mean of the magnitudes of the data items.

34. The system of claim 30, wherein the threshold value comprises the sum of the mean of the magnitudes of the data items and a second number.

35. The system of claim 30, wherein the processor is configured to represent an outlier data item as a modified image having a size equal to a maximum image size.

36. The system of claim 30, wherein the processor is configured:

to represent an outlier data item as a modified image having a size equal to a maximum image size, and to represent the non-outlier data item having the largest magnitude as an image having a size equal to a designated percentage of the maximum image size.

37. The system of claim 30, wherein the processor is further configured to associate a call-out legend with a modified image to indicate the magnitude of the corresponding outlier data item.

38. The system of claim 30, wherein each image comprises a bar in a bar graph, and wherein each modified image comprises a bar with a break therein.

39. The system of claim 30, wherein the processor is further configured to associate a call-out legend with a modified image to indicate the magnitude of the corresponding outlier data item, and not associating call-out legends with images corresponding to non-outlier data items.

40. A system for graphically representing a plurality of data items, wherein each data item has a numerically quantifiable magnitude and at least one data item is an outlier, comprising:

a display;

a memory; and a processor configured to:

access the data items stored in the memory, determine a threshold value for the data items, compare the magnitude of each data item with the threshold value to determine if each of the data items is an outlier, represent non-outlier data items on the display as images having relative sizes with proportions having substantially the same relative ratios as the magnitudes of the non-outlier data items, determine whether the size of an image modification bears a predetermined relation to a maximum image size, represent each outlier data item as a modified image the size of the image modification for the outlier data item bears the predetermined relation to the maximum image size, and represent each outlier data item as though it was a non-outlier data item if the size of the image modification for the outlier data item does not bear the predetermined relation to the maximum image size.

41. The system of claim 40, wherein the predetermined relation comprises the state of being less than a designated percentage of the maximum image size.

42. A system for graphically representing a plurality of data items, wherein each data item has a numerically quantifiable magnitude and at least one data item is an outlier, comprising:

a display;

a memory; and a processor configured to:

access the data items stored in the memory, determine a threshold value for the data items, compare the magnitude of each data item with the threshold value to determine if each of the data items is an outlier, represent non-outlier data items on the display as images having relative sizes with proportions having substantially the same relative ratios as the magnitudes of the non-outlier data items, and represent each outlier data item on the display as a modified image, wherein the processor is configured to represent each outlier data item as a modified image with a size adjusted in relation to the magnitudes of other outlier data items, and wherein outlier data items having different values are represented as modified images of differing sizes.

* * * * *